(12) United States Patent
Squire

(10) Patent No.: US 12,527,980 B2
(45) Date of Patent: Jan. 20, 2026

(54) ENERGY ABSORBER DEVICE

(71) Applicant: Latchways plc, Devizes (GB)

(72) Inventor: Jacob Thackeray Squire, Devizes (GB)

(73) Assignee: MSA Technology, LLC, Cranberry Township, PA (US)

(*) Notice: Subject to any disclaimer, the term of this patent is extended or adjusted under 35 U.S.C. 154(b) by 75 days.

(21) Appl. No.: 18/686,978

(22) PCT Filed: Aug. 31, 2022

(86) PCT No.: PCT/EP2022/074185
§ 371 (c)(1),
(2) Date: Feb. 27, 2024

(87) PCT Pub. No.: WO2023/031263
PCT Pub. Date: Mar. 9, 2023

(65) Prior Publication Data
US 2024/0350840 A1 Oct. 24, 2024

(30) Foreign Application Priority Data
Sep. 1, 2021 (GB) ...................... 2112450

(51) Int. Cl.
*A62B 35/04* (2006.01)
*A62B 35/00* (2006.01)

(52) U.S. Cl.
CPC .......... *A62B 35/04* (2013.01); *A62B 35/0056* (2013.01)

(58) Field of Classification Search
CPC ............................ A62B 35/04; A62B 35/0056
(Continued)

(56) References Cited

U.S. PATENT DOCUMENTS 3,444,957 A * 5/1969 Gilpin, Jr. .............. A62B 35/04
182/3
5,090,503 A * 2/1992 Bell ....................... A62B 35/04
182/5
(Continued)

FOREIGN PATENT DOCUMENTS

| FR | 2857601 A1 | 1/2005 |
| GB | 2571948 A | 9/2019 |
| JP | H0824352 A | 1/1996 |

OTHER PUBLICATIONS

Patent Cooperation Treaty, PCT/EP2022/074185, International Search Report and Written Opinion; Nov. 30, 2022.

*Primary Examiner* — Anita M King
(74) *Attorney, Agent, or Firm* — Jones Day

(57) ABSTRACT

An energy absorber device for use in a fall protection system has an energy absorber in the form of an elongate flexible element having first end spaced apart from and a second end. A containment structure (such as a housing or jacket) contains the energy absorber in an un-deployed state and has a first end secured with respect to the elongate flexible element near the first end of the elongate flexible element. The second end of the containment structure has a deployment exit such that in the event of deployment of the energy absorber arrangement, the elongate flexible element is pulled through the deployment exit. The device provides for easier deployment of the elongate flexible element than other designs employing hard shell casings or housings. Movement on the elongate flexible element is also highly resisted.

21 Claims, 2 Drawing Sheets

(58) Field of Classification Search
USPC .......................................................... 248/636
See application file for complete search history.

(56) References Cited

U.S. PATENT DOCUMENTS

| | | | | |
|---|---|---|---|---|
| 5,332,071 | A * | 7/1994 | Duncan | E04G 21/3295 267/74 |
| 5,598,900 | A * | 2/1997 | O'Rourke | A62B 35/0056 182/18 |
| 10,125,837 | B1 | 11/2018 | Fegley et al. | |
| 10,413,762 | B2 * | 9/2019 | Patton | A62B 35/0037 |

* cited by examiner

ENERGY ABSORBER DEVICE

CROSS-REFERENCE TO RELATED APPLICATIONS

This application is a U.S. National Stage Application under 35 U.S.C. § 371 of International Patent Application No. PCT/EP2022/074185, filed Aug. 31, 2022, which claims priority to United Kingdom Patent Application No. 21124508, filed Sep. 1, 2021, the disclosures of which are incorporated by reference in their entireties.

INTRODUCTION

The present application relates to safety devices for use in a fall protection system and in particular to energy absorber devices comprising elongate flexible elements which are deployed to absorb the energy of a fall arrest event.

Fall arrest systems are used to prevent personnel working at height from suffering injury as a result of falling. Fall arrest systems are often referred to as height safety systems or fall prevention or protection systems or apparatus.

Such systems can fall into different types. The present invention will primarily be described in relation to a horizontal safety line system. It should readily be appreciated that the invention is applicable to other fall arrest or fall protection systems.

Energy absorber devices can be provided attached to, for example, horizontal tensioned safety lines, positioned on a roof surface or at other elevated location. In such systems (which may be temporary or fixed) the safety line is strung and tensioned between anchor points (such as anchor posts) and the user clips their personal lifeline or lanyard (usually tethered to a harness worn by the user) to the tensioned horizontal safety line. The energy absorber device can be positioned between an anchor point and the end of the tensioned safety line to be deployed in the event that the user falls. Such an arrangement is disclosed in for example U.S. Pat. No. 10,512,802. The present invention is applicable to such horizontal systems.

So-called safety block systems are arranged to be suspended overhead from an anchor structure. Such arrangements typically include a drum upon which a safety line is wound, and a speed responsive mechanism arranged to inhibit the drum rotation above a predetermined rotational speed.

It is known to provide an energy absorber device within the safety block which is arranged to be activated if a load above a predetermined threshold is applied to the safety line when the speed responsive mechanism is deployed. These internal energy absorber devices are typically either friction brake devices or plastically deformable metallic strip arrangements that are plastically deformed during deployment in order to absorb energy. The present invention has application in such safety block systems.

It is also known to provide an external energy absorber device, separate to a personal energy absorber which is usually connected between the safety line and the user. For example, the energy absorber device may be connected to a harness worn by a user. The present invention has applicability to such personal harness type systems.

An energy absorber device comprising an elongate flexible element, sometimes referred to as a textile or tear webbing energy absorber device, is a type of external energy absorber device. In response to a fall arrest event, the elongate flexible or textile element is unfurled or deployed which absorbs the energy of the user's fall. Typically, the elongate flexible element comprises webbing having portions stitched together. As the flexible elongate webbing is deployed the stitching tears apart resulting in energy of the fall being absorbed. Examples of such energy absorber devices are described in WO2017/078669, WO2019/175543 and WO2019/175542.

An improved arrangement has now been devised.

SUMMARY

An energy absorber device for use in a fall protection system comprises: an energy absorber arrangement comprising an elongate flexible element having first and second ends; and a containment structure (such as a jacket or housing) for containing the energy absorber arrangement in an un-deployed state. The containment structure may have a first end and a second end. The first end of the containment structure may be secured with respect to the elongate flexible element proximate the first end of the elongate flexible element. The second end of the containment structure may be provided with a deployment exit such that in the event of deployment of the energy absorber arrangement, the elongate flexible element is pulled through the deployment exit.

The elongate flexible element is preferably stored coiled or folded within the containment structure, prior to deployment. Such coil or folded form flexible energy absorber configurations are known in the art and disclosed for example in WO2017/078669, WO2019/175543 and WO2019/175542.

In an embodiment, the second end of the elongate flexible element protrudes through the deployment exit in the un-deployed state.

In an embodiment, the first end of the elongate flexible element protrudes through the first end of the containment structure in the un-deployed state.

The elongate flexible element may be provided at one or both ends with a connection structure such as a loop for connection to a karabiner, clip, or other connection device.

In an embodiment, following deployment of the energy absorber arrangement, the first end of the containment structure remains secured with respect to the elongate flexible element proximate the first end of the elongate flexible element.

In an embodiment, the first end of the containment structure may be provided with clamping surfaces which clamp the elongate flexible element between the clamping surfaces in order to secure the first end of the containment structure with respect to the elongate flexible element proximate the first end of the elongate flexible element.

In an embodiment the first end of the containment structure can be permanently fixed and secured to the elongate flexible element proximate the first end of the elongate flexible element.

In an embodiment, the containment structure may comprise two or more housing body parts (for example two body halves) secured to one another to define a cavity receiving the energy absorber arrangement in the un-deployed state. The two or more housing body parts may be secured to one another by mechanical fixings.

In an embodiment, the housing body parts of the containment structure may be secured to one another so as to clamp the elongate flexible element between the housing body parts in order to secure the first end of the containment structure with respect to the elongate flexible element proximate the first end of the elongate flexible element.

In an embodiment, the deployment exit may comprise an exit opening through which the elongate flexible element extends and may be deployed.

In an embodiment, the exit opening may comprise a flexible skirt. The flexible skirt may encompass the elongate flexible element proximate the second end of the elongate flexible element as the second end of the elongate flexible element protrudes through the deployment exit in the un-deployed state.

In an embodiment, the deployment exit opening, or skirt may clamp or grip (preferably lightly) the elongate flexible element proximate the second end of the elongate flexible element protruding through the deployment exit in the un-deployed state. It is preferred that the elongate flexible element is only lightly gripped or clamped proximate the second end of the elongate flexible element because this enables the containment structure to retain the coiled or folded elongate flexible element in its un-deployed state but does not hinder deployment of the elongate flexible element in the occurrence of a fall event. By lightly gripping the opening size is minimized and the gap between the opening and the elongate flexible element is minimised in order to reduce the prospect of water ingress.

In an embodiment, the flexible skirt is flexible enough to deflect to permit the elongate flexible element being pulled through the deployment exit.

In an embodiment, the flexible skirt comprises a slitted or slotted zone having deflectable fingers.

In an embodiment, the elongate flexible element is deployed to an elongated state, preferably from an un-deployed folded, coiled, or wrapped state.

In an embodiment, following deployment of the elongate flexible element the structure remains in place or clamped on the webbing, preferably by at least by being secured with respect to the elongate flexible element proximate the first end of the elongate flexible element.

In an embodiment, the containment structure comprises two or more housing body parts secured to one another to define an over molded jacket for the energy absorber in the un-deployed state; and in which the housing body parts of the jacket are preferably secured to one another by mechanical fixings so as to clamp the elongate flexible element between the housing body parts in order to secure the first end of the containment structure with respect to the elongate flexible element proximate the first end of the elongate flexible element.

In an embodiment the body parts are integrally formed to provide at the first end of the containment structure clamping surfaces for clamping the elongate flexible element proximate its first end and, at the second end of the containment structure an opening defining the deployment exit, preferably wherein the opening has a peripheral flexible skirt.

In an embodiment, the body parts may be formed of a flexible or resilient or deformable material such as a rubber or rubber-like material.

In an embodiment, the thickness of the containment structure at the first end securing the structure with respect to the elongate flexible element of the energy absorber is greater than the thickness of the containment structure at the second end providing the deployment exit.

The energy absorber device is particularly beneficially suited to applications in horizontal tensioned lifeline systems.

The energy absorber device provides for easier deployment of the elongate flexible element (tear webbing) than other designs employing hard shell casings or housings that need to fracture or be forced open in some other way. The secure clamping ensures that movement on the elongate flexible element (webbing) is highly resisted due to the secure clamped end of the housing on the elongate flexible element (webbing). Also, the risk of damage and exposure that exists where soft-shell casings are employed in the prior art is minimised by the design.

SPECIFIC DESCRIPTION

Illustrative embodiments of the invention will now be described by way of example only and with reference to the accompanying drawings, in which.

Figure 1:
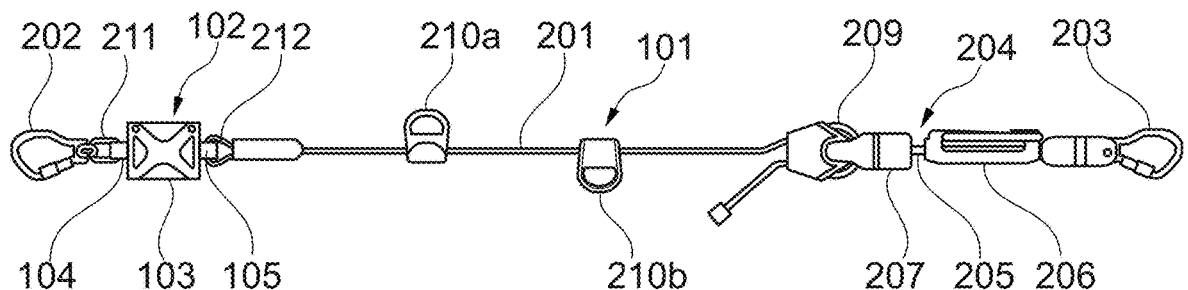
FIG. 1 shows a side view of a safety line system incorporating an energy absorber device.
Figure 6:
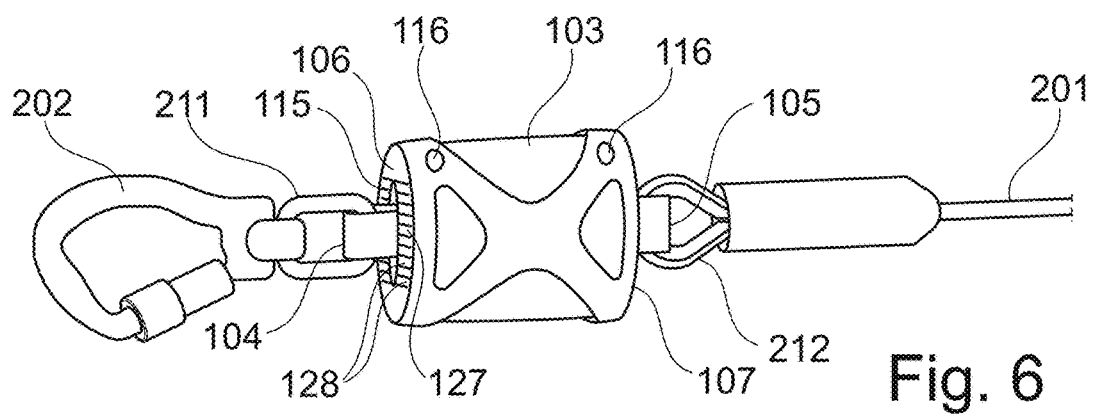
FIG. 6 is a close-up view of the energy absorber device used in the system of FIG. 1.

Referring to the drawings and initially to FIGS. 1 and 6, there is shown a fall protection system 101 for use in working at height applications. The fall protection system 101 comprises a lifeline 201 which is connected at its ends to support posts (not shown) by means of Karabiners 202, 203. Karabiner 203 is mounted via a tensioning device 204 comprising a termination 209 around which an end of the lifeline 201 is wound and secured. A turnbuckle 206 is rotated to cause a threaded shaft 205 to rotate which moves the termination 209 relative to the component 207 to cause the lifeline 201 to be securely gripped and tensioned. The operation of the tensioning device 204 is incidental to the present disclosure.

Travellers 210a, 210b are mounted to the lifeline 201 and a user clips onto the traveller 210a, 210b using a safety line connected to a personal harness worn by the user, as is well known in the field.

Figure 2:
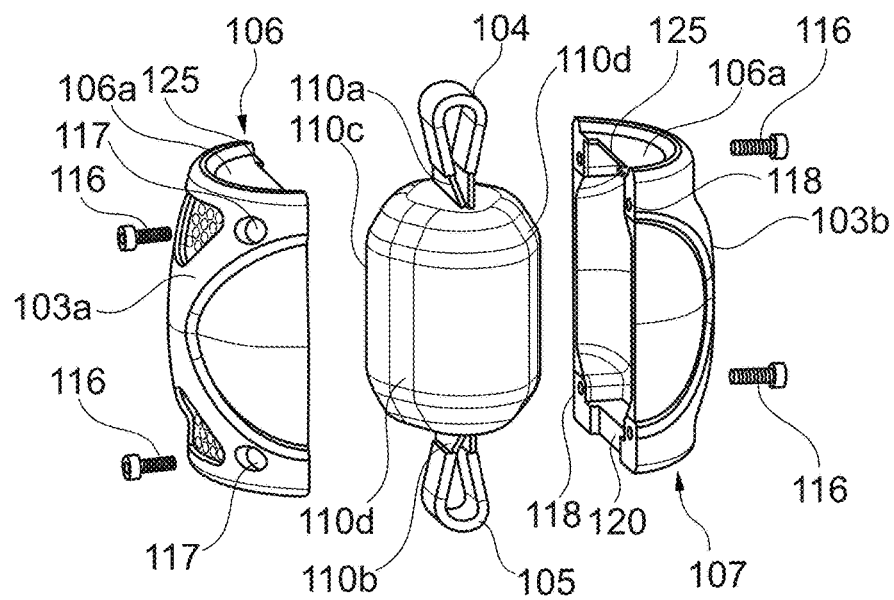
FIG. 2 is a perspective exploded view of the energy absorber device shown in the system of FIG. 1.
Figure 3:
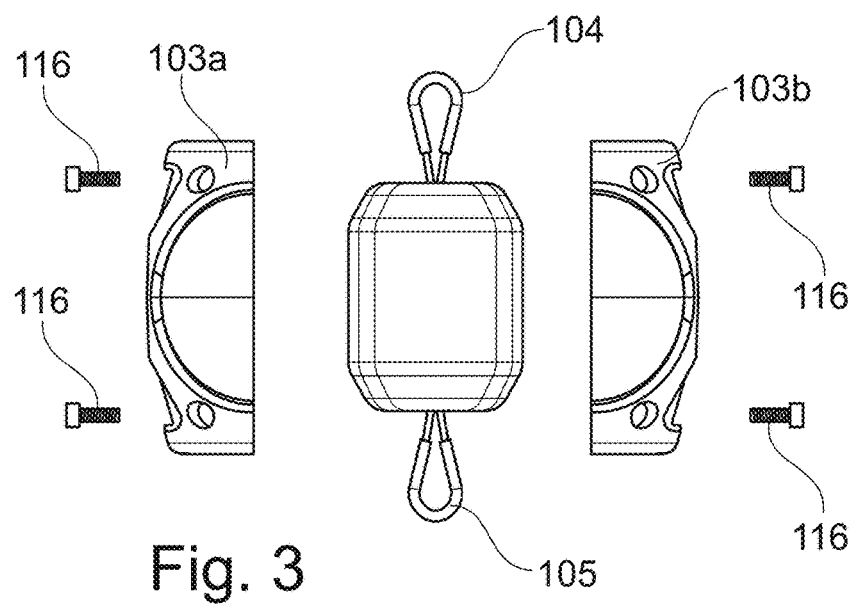
FIG. 3 is an exploded side view corresponding to FIG. 2.

At the other end of the lifeline 201 an energy absorber device 102 is positioned between and connected to the karabiner 202 (by an intervening shackle 211) and the termination eye 212 of the lifeline 201. The energy absorber device 102 comprises a housing 103 containing an energy absorber arrangement, which in the present embodiment, comprises a wound, folded or wrapped length of a flexible tear webbing energy absorber as is known in the art and disclosed for example in WO2017/078669, WO2019/175543 and WO2019/175542. In FIGS. 1 and 6 the energy absorber device 102 is shown with the wound, folded or wrapped length of a flexible tear webbing energy absorber 110 in its undeployed state contained within the housing and in which the respective ends 110a, 110b of the length of a flexible tear webbing energy absorber 110 can be seen protruding from opposite ends of the housing formed into terminal loops 104, 105. As shown in FIGS. 2 and 3 the flexible tear webbing energy absorber 110 is formed into a pack 110c secured by paper tapes 110d. This aids the positioning of the pack in the housing 103. The terminal loops 104, 105 enable connection to the shackle 211 and eye 212 respectively. The loop 105 extends outwardly from the housing 103 at a first end 107 of the housing. The loop 104 protrudes through a deployment exit aperture 115 formed in a second end 106 of the housing.

As shown most clearly in FIGS. 2 and 3 the housing comprises a jacket formed of rubber or other deformable material which is formed of two molded body halves 103a, 103b, which are secured together by mechanical fixings (screws 116 passing through openings 117 and mating in receiving bores 118). The body halves 103a, 103b cooperate to define an internal cavity or chamber for receiving the tear webbing pack 110c.

At the first end 107 the housing, each body half 103a, 103b is formed to have a relatively thick end-wall (thick in the axial direction of the housing). The thick end-wall is provided with a clamping surface recess 120 shaped to accommodate the end 110b of the tear webbing such that when the two body halves 103a, 103b are secured together the portion 110b of the webbing is very securely clamped between the clamping surfaces 120 of the two body halves 103a, 103b. In an alternative embodiment the end wall 106 can be permanently fixed (by bonding or mechanical fixing, for example) to the portion 110b of the tear webbing.

At the second end 106 of the housing, each body half 103a, 103b is formed to have a relatively thin end-wall 106a (thin in the axial direction of the housing). The thin end-wall is provided with a recess 125 shaped to accommodate the end 110a of the tear webbing such that when the two body halves 103a, 103b are secured together, the portion 110a of the webbing is only lightly clamped or gripped between the surfaces 125 of the two body halves 103a, 103b. The surfaces 125 define the deployment exit opening 115.

The arrangement as described ensures that the tear webbing pack 110c is held in the cavity of the housing 103 being tightly clamped and secured at the portion 110b, but only lightly clamped or gripped at the portion 110a. This is sufficient to ensure that the webbing is held in the cavity of the housing before being deployed via the deployment exit opening 115 but can easily and readily deploy by being pulled through the deployment exit aperture 115 in the event of a fall arrest situation. As such, in the event of a fall arrest situation, the webbing is released from the un-deployed state shown in the figures by being pulled through the deployment exit aperture 115 at the second end 106 of the housing. Following deployment of the tear webbing, the housing 103 remains secured in position at the clamped portion 110b of the tear webbing.

Figure 4:
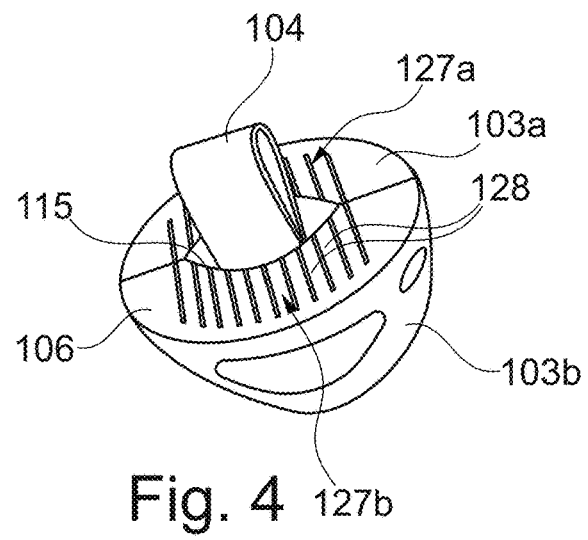
FIG. 4 is a perspective view of a second end of the energy absorber device of the preceding figures.
Figure 5:
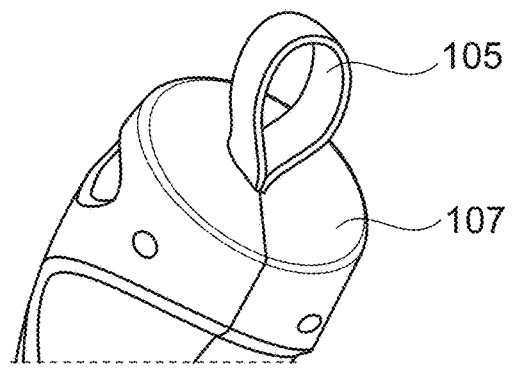
FIG. 5 is a perspective view of a first end of the energy absorber device of the preceding figures.

As shown most clearly in FIGS. 4 and 6, at the thin end 106 of the housing, the body halves 103a, 103b are formed to have a flexible skirt portion 127, 127a, 127b which are slitted areas defining flexible fingers 128. The flexible skirt portion 127 aids in ensuring that the portion 110a of the webbing is only lightly gripped and can be deployed as required through the deployment exit aperture 115 in the event of a fall arrest situation.

In the event of a fall, the user exerts tension on the lifeline 201 in a sideways direction and the energy absorber device 102 deploys. The tear webbing rips apart along stitched together seams absorbing energy of the fall (this is known in the art). The tear webbing extends the effective length of the lifeline 201 as it is pulled out through the deployment exit opening 115 at the end 106 of the housing 103. The housing 103 remains secured to the webbing at the other end 107 by virtue of the secure clamping to the tear webbing at portion 110b.

The lifeline 201 shown in FIG. 1 is not to scale and in practice the lifeline 201 may be of indeterminate length. The energy absorber device 102 has been described in use in a static horizontal lifeline, but it will be readily appreciated by those skilled in the art that the energy absorbing device 102 is equally suitable for use in other fall arrest or fall protection systems such as with retractable safety line systems (self-retracting lifelines) or harness and lanyard systems.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. An energy absorber device for use in a fall protection system, the device comprising:
   an energy absorber arrangement comprising an elongate flexible element having a first end spaced apart from a second end; and
   a containment structure for containing the energy absorber arrangement in an un-deployed state, the containment structure having a first end and a second end, the first end of the containment structure being secured with respect to the elongate flexible element proximate the first end of the elongate flexible element and the second end of the containment structure being provided with a deployment exit comprising a flexible skirt such that in the event of deployment of the energy absorber arrangement, the elongate flexible element is pulled through the flexible skirt of the deployment exit.

2. The energy absorber device of claim 1, wherein the elongate flexible element is stored coiled or folded within the containment structure, prior to deployment.

3. The energy absorber device of claim 1, wherein the second end of the elongate flexible element protrudes through the deployment exit in the un-deployed state.

4. The energy absorber device of claim 1, wherein the first end of the elongate flexible element protrudes through the first end of the containment structure in the un-deployed state.

5. The energy absorber device of claim 1, wherein the first end of the containment structure remains secured with respect to the elongate flexible element proximate the first end of the elongate flexible element.

6. The energy absorber device of claim 1, wherein the first end of the containment structure is provided with clamping surfaces which clamp the elongate flexible element between the clamping surfaces in order to secure the first end of the containment structure with respect to the elongate flexible element proximate the first end of the elongate flexible element.

7. The energy absorber device of claim 1, wherein the containment structure comprises two or more housing body parts secured to one another to define a cavity receiving the energy absorber arrangement in the un-deployed state.

8. The energy absorber device of claim 7, wherein the two or more housing body parts of the containment structure are secured to one another so as to clamp the elongate flexible element between the two or more housing body parts in order to secure the first end of the containment structure with respect to the elongate flexible element proximate the first end of the elongate flexible element.

9. The energy absorber device of claim 1, wherein the deployment exit comprises an opening.

10. The energy absorber device of claim 1, wherein the flexible skirt encompasses the elongate flexible element proximate the second end of the elongate flexible element and wherein the second end of the elongate flexible element protrudes through the deployment exit in the un-deployed state.

11. The energy absorber device of claim 9, wherein the opening clamps or grips the flexible element proximate the second end of the elongate flexible element and wherein the second end of the elongate flexible element protrudes through the deployment exit in the un-deployed state.

12. The energy absorber device of claim 10, wherein the flexible skirt is flexible enough to deflect to permit the elongate flexible element to be pulled through the deployment exit.

13. The energy absorber device of claim 10, wherein the flexible skirt comprises a slitted or slotted zone having one or more deflectable fingers.

14. The energy absorber device of claim 1, wherein the elongate flexible element is deployed to an elongated state.

15. The energy absorber device of claim 1, wherein following deployment of the elongate flexible element the containment structure remains clamped on the first end of the elongate flexible element.

16. The energy absorber device of claim 10, wherein the containment structure comprises two or more housing body parts secured to one another to define an over molded jacket for the elongate flexible element in the un-deployed state; and in which the two or more housing body parts of the over molded jacket are secured to one another by mechanical fixings so as to clamp the elongate flexible element between the two or more housing body parts in order to secure the first end of the containment structure with respect to the elongate flexible element proximate the first end of the elongate flexible element.

17. The energy absorber device of claim 1, wherein two or more housing body parts are integrally formed to provide at the first end of the containment structure clamping surfaces for clamping the elongate flexible element proximate the first end of the elongate flexible element and, at the second end of the containment structure an opening defining the deployment exit, preferably wherein the opening has a peripheral flexible skirt.

18. The energy absorber device of claim 16, wherein the two or more housing body parts are formed of a flexible material such as a rubber or rubber-like material.

19. The energy absorber device of claim 17, wherein a thickness of the first end of the containment structure securing the containment structure with respect to the elongate flexible element is greater than the thickness of the second end of the containment structure providing the deployment exit.

20. A fall protection system comprising the energy absorber device according to claim 10.

21. The fall protection system according to claim 20, wherein the fall protection system comprises a horizontal lifeline system and the energy absorber device is provided at one or both ends of the horizontal lifeline.

* * * * *